J. WEIR.

PULLEY-BLOCKS.

No. 7,444. Reissued Dec. 19, 1876.

Witnesses

Chas H. Smith

Harold Serell

Inventor.

John Weir for L. W. Serrell atty

THE GRAPHIC CO. N.Y.

UNITED STATES PATENT OFFICE

JOHN WEIR, OF NEW YORK, N. Y.

IMPROVEMENT IN PULLEY-BLOCKS.

Specification forming part of Letters Patent No. 179,239, dated June 27, 1876; reissue No. 7,444, dated December 19, 1876; application filed September 18, 1876.

*To all whom it may concern:*

Be it known that I, JOHN WEIR, of the city and State of New York, have invented an Improvement in Pulley-Blocks, of which the following is a specification:

Pulley-blocks have been made with a flat iron strap passing partially or entirely around the block, with the sheave-axle going through the same and riveted, and a hook or eye at one end, swiveled or otherwise connected thereto. Blocks have also been made with a wire band passing around the wooden shell, and twisted to form the eye, as in my patent No. 166,167.

My present invention relates to a pulley-block, in which the wire strap forming the eye extends to and is connected with the sheave-axle.

Figure 1:
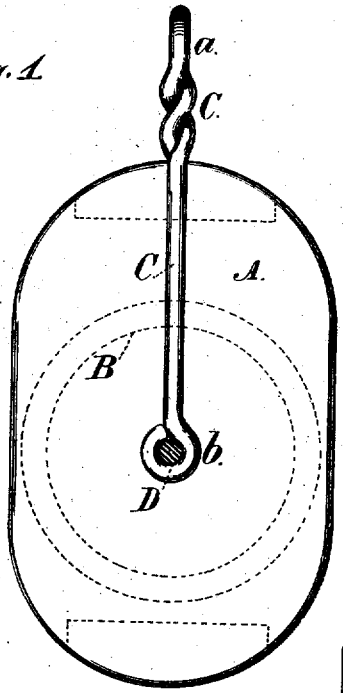
Figure 2:
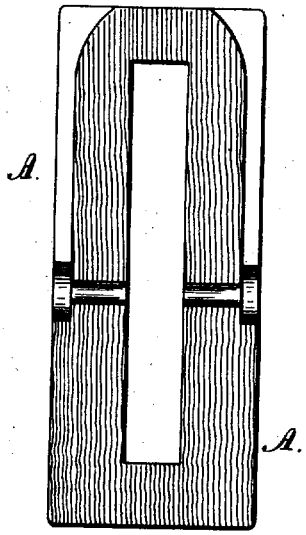
Figure 3:
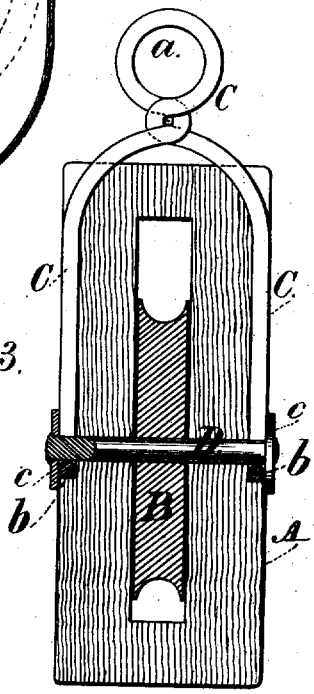

In the drawing, Figure 1 is a side view of the block complete. Fig. 2 is a vertical section of the wooden shell, and Fig. 3 is a vertical section of the block complete.

The wooden shell A is of the usual shape, and mortised to receive the sheave B that revolves upon the axle D. The outer faces of the shell A are grooved from the sheave-pin to the end, for the reception of the wire C, forming the supporting-band. This is bent to form the eye *a* at the end of the block, and the wood of the shell A is also recessed around the end of the sheave-axle D, for the reception of the eyes *b*, bent in the end of the wire of the band C, and through which the axle D passes and is riveted.

The washers *c* are, by preference, employed upon the ends of the axle D to more firmly retain the eyes *b* around the sheave-axle; but nuts upon the axle might be substituted for the washers, or the wire of the axle may alone be riveted.

This block is very strong, cheap to construct, and it is especially adapted to small-sized blocks, because the wire eyes *b*, being confined within the wooden recess in the shell, will not pull out or become disconnected from the axle.

I claim as my invention—

The pulley-block, having a metal axle for the sheave, in combination with a suspending wire strap connected to such axle, and occupying recesses in the cheeks of the block, and having the eye *a*, substantially as and for the purposes set forth.

Signed by me this 11th day of September, A. D. 1876.

JOHN WEIR.

Witnesses:

GEO. T. PINCKNEY,
CHAS. H. SMITH.